May 19, 1936. L. E. LA BRIE 2,041,073
INTERNAL COMBUSTION ENGINE
Filed July 29, 1932 2 Sheets-Sheet 2
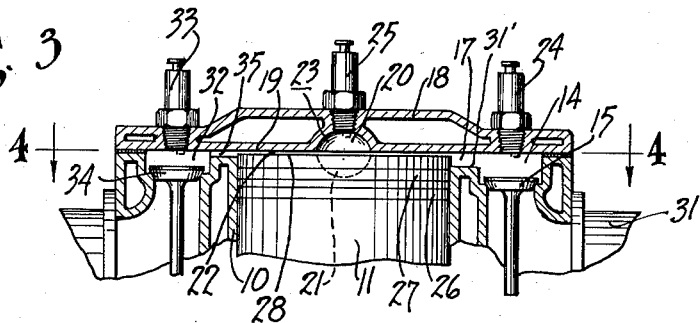
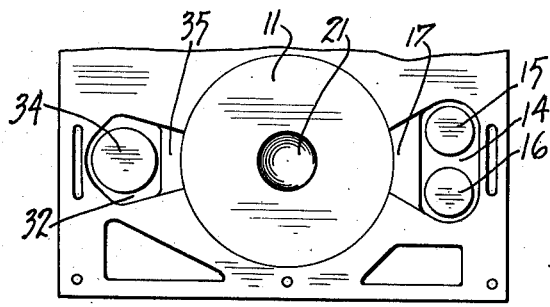
INVENTOR.
Ludger E. LaBrie Patented May 19, 1936

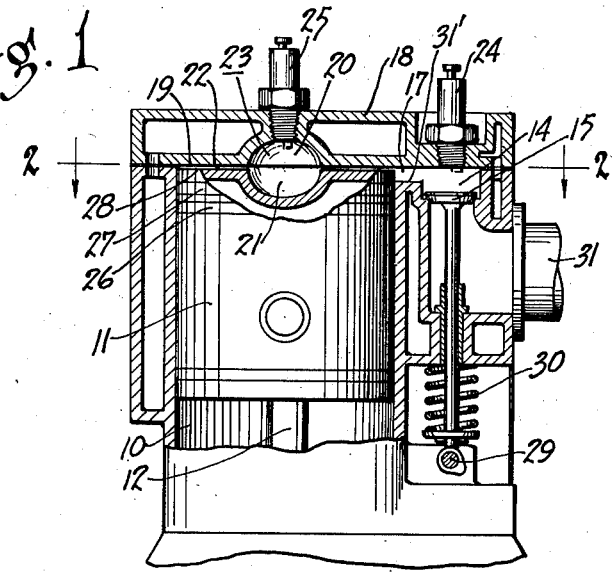
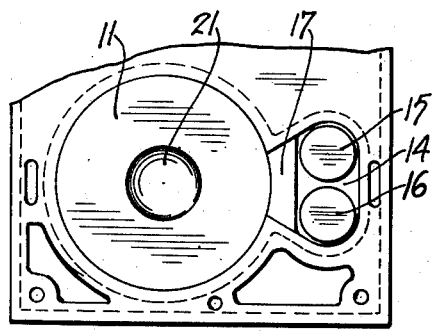
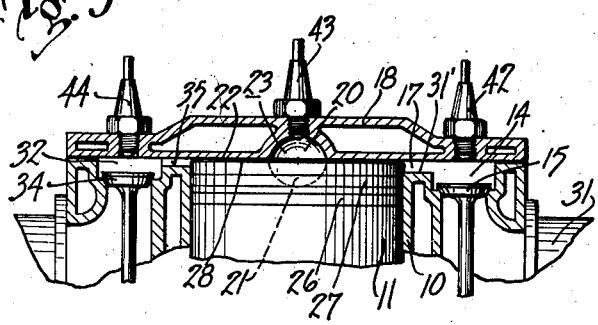

2,041,073

UNITED STATES PATENT OFFICE 2,041,073

INTERNAL COMBUSTION ENGINE

Ludger E. La Brie, South Bend, Ind.

Application July 29, 1932, Serial No. 626,149

13 Claims. (Cl. 123—191)

This invention pertains to the four stroke cycle internal combustion engine, the two stroke cycle internal combustion engine, and the Diesel or semi-Diesel type of internal combustion engine.

In most high compression internal combustion engines used on automotive vehicles it is necessary to use some form of "doped" or "antiknock" fuel in order to obtain smooth operation and to avoid detonation.

It is well known in the art, that further increase in compression pressures would result in increased efficiency of internal combustion engines. However, even with the anti-knock fuels available commercially today, an increase in compression pressures above the maximum now in use would result in trouble caused by detonation.

Investigators have demonstrated by means of laboratory tests that the primary cause of detonation is due to supercompression of the unburned portion of the charge by the flame front as it travels from the spark plug (or initial ignition point) toward the combustion chamber walls. This supercompression of the unburned portion of the charge causes it to burn instantaneously or explode, instead of burning at the relatively slow rate of approximately 80 feet per second when detonation is not present. The instantaneous burning or explosion of the unburned portions of the charge results in unusually high pressures at a time when the piston has not quite reached top dead center position, and is still moving inwards on its compression stroke; and producing the well known "ping" or "knock" and contributing to low efficiency of the engine.

From the above, it will be understood that the more compact and the smaller is the volume of the combustion chamber, the more remote is the possibility of detonation.

An object of this invention is to provide an internal combustion engine in which unusually high compression pressures are possible without danger of detonation, and thus to contribute to the increased efficiency of the engine.

Another object of the invention is to provide means for compressing a charge of combustible mixture into a plurality of combustion chambers of small volume, and to provide individual ignition means for each of said combustion chambers operative to ignite all of the combustion chambers simultaneously or successively.

Another object of the invention is to provide a plurality of combustion chambers continuously in communication with each other, and to restrict communication between said combustion chambers at the time of ignition.

A further object of the invention is to provide scavenging means for a plurality of combustion chambers.

A still further object of the invention is to provide a plurality of combustion chambers of relatively small volume together with means for producing turbulence of the compressed charge in said combustion chambers.

Other objects and advantages will appear in the following specification, and the novel features will be particularly pointed out in the appended claims.

The invention is illustrated in the accompanying drawings forming part of this application in which:

Figure 1 is a vertical section through a four stroke cycle type of internal combustion engine embodying one form of the invention;

Figure 2 is a horizontal section on line 2—2 of Figure 1;

Figure 3 is a vertical section through a four stroke cycle type of internal combustion engine, embodying another form of the invention;

Figure 4 is a horizontal section on line 4—4 of Figure 3; and

Figure 5 is a vertical section through an internal combustion engine of the Diesel type embodying one form of the invention.

Referring to the drawings, Figures 1 and 2 illustrate one form of the invention as applied to an otherwise conventional L head four stroke cycle internal combustion engine.

The cylinder 10 is provided with a piston 11 attached to the usual crank shaft (not shown) by means of the connecting rod 12. Said cylinder 10 is provided at one side with a combined valve pocket and combustion chamber 14, in which are placed the usual intake and exhaust valves 15 and 16, respectively. The cylinder 10 is provided with an opening or port 17 affording communication above the piston 11 between said cylinder 10 and said combustion chamber 14. A cylinder head 18 is provided to effectively close said cylinder 10. The inner surface 19 of said cylinder head 18 is generally flat except for the generally semi-spherical pocket or depression 20, and forms one wall of combustion chamber 14. The pocket 20, in conjunction with a corresponding pocket or depression 21 in the piston 11, and with the clearance 22, forms another combustion chamber, and this will hereinafter be referred to by the numeral 23. Each of the combustion chambers 14 and 23 are provided with individual spark plugs 24 and 25 respectively. The piston 11 is fitted with conventional sealing piston rings 26 and 27, except that the distance between the top of the piston 11 and the top ring 27 is more than usual, and is almost equal to the height of port 17. The clearance 22 between the cylinder head 18 and the piston head 28 is small, and only large enough to prevent the piston head 28 from touching the cylinder head 18 under the most adverse conditions, for example after accumulation of carbon during long use. The inlet and exhaust valves 15 and 16 are actuated by the cam shaft 29 and valve springs 30 in the usual manner.

The operating cycle of the engine, and the purpose of the novel features will now be explained. As the piston 11 moves outward on its intake stroke the inlet valve 15 is opened allowing a charge of combustible mixture to be drawn through the intake manifold 31 into chamber 14, through port 17 into the cylinder 10 above the piston.

From the foregoing it will now be evident that the compression pressures in combustion chambers 14 and 23 can be considerably higher than in conventional engines, and this without danger of detonation. This result is accomplished by compressing and igniting the combustible charge in a plurality of combustion chambers of small volume, instead of in a single combustion chamber of comparatively large volume. Since two combustion chambers are employed in the form of the invention under consideration, the volume of each of the combustion chambers 14 and 23 is approximately 50 percent smaller than the single combustion chamber in a conventional engine. Since detonation is caused by compression of the unburned portion of the charge by the flame front as it travels toward the combustion chamber walls, it now is evident that the smaller the volume of the combustion chamber, the higher the compression pressures can be made without danger of detonation. For example, in the form of the invention shown in Figures 1 and 2, the compression ratio could be raised up to 9 to 1 instead of 6 to 1 for a conventional high compression engine. This makes possible considerably increased efficiency for an engine of given displacement. Furthermore, higher compression ratios than are now usual could be utilized without necessitating the use of "anti-knock" fuels.

It will be noted, that when the piston 11 approaches the end of its compression stroke, and when the spark plugs 24 and 25 are about to fire, the clearance 22 has already become small even though the piston 11 has not reached the end of its compression stroke. This small clearance 22 will tend to create a high turbulence of the charge in combustion chambers 14 and 23, and this is also an important factor in preventing detonation.

Attention is now called to the fact that the piston head 28 projects above the lower edge 31' of port 17 for a considerable distance, with the result that at the time of ignition, communication between the chambers 14 and 23 is greatly restricted, and is decreased further until when said piston 11 has reached its innermost position, the effective height of port 17 is only equal to the clearance 22 or the small distance between the piston head 28 and the inner side of the cylinder head 19. The above results in highly restricted communication between combustion chambers 14 and 23 at the time of ignition and for the short period after ignition during which flame propagation takes place within the combustion chambers, and this tends to make each combustion chamber operate as though it were entirely separated from the other. As the piston 11 begins to move outward on its expansion stroke, normal communication is restored between the combustion chambers 14 and 23 and the expansion of the charge in both combustion chambers operates unrestrictedly in driving the piston.

It will be noted that the combustion chamber 14 is approximately rectangular in form, while the combustion chamber 23 is of more ideal and generally spherical form. For this reason it may be desirable to ignite the combustion chambers successively instead of simultaneously. For example, since combustion chamber 23 is of more ideal form for rapid flame propagation than chamber 14, and since combustion is more rapid in the former than in the latter, combustion chamber 14 can be ignited slightly ahead of chamber 23 in order to make ignition complete in both chambers at substantially the same time. Likewise, combustion chamber 14 would be ignited first if its volume would be made larger than that of combustion chamber 23.

Figures 3 and 4 illustrate another form of the invention as applied to a four stroke cycle internal combustion engine. In this arrangement three combustion chambers are employed, each having individual ignition means. The construction of the engine is similar to that illustrated in Figures 1 and 2, except for the addition of a third combustion chamber 32. Said chamber 32 is provided with a spark plug 33, and with an exhaust valve 34. Said exhaust valve 34 is for the purpose of scavenging the combustion chamber 32 after the expansion stroke, and is actuated by a camshaft and valve spring, not shown. The cycle of operation of this arrangement is similar to that of the engine illustrated in Figures 1 and 2, except that since three combustion chambers are employed, the volume of each of the combustion chambers is still further reduced, and consequently the compression pressures can be still higher without producing detonation.

In this arrangement it may be desirable to ignite combustion chamber 23 first, and then ignite combustion chambers 14 and 32 simultaneously since the latter are of approximately the same form and volume. Combustion chamber 32 is in continuous communication with chambers 14 and 33 by means of the port 35. It will be noted that the height of this port is less than that of port 17, because said port 35 has only to admit a portion of the charge from the cylinder under pressure during the compression stroke, while port 17 has to admit the charge into the cylinder during the intake stroke, as well as to allow the burned gas to pass from the cylinder to chamber 14, and through the exhaust valve 16 to the exhaust manifold. In addition to scavenging chamber 32 the exhaust valve 34 also aids in scavenging the cylinder 10 and combustion chamber 23.

Figure 5 illustrates another form of the invention as embodied in an internal combustion engine of the Diesel or semi-Diesel type. The construction of the engine is similar to that illustrated in Figures 3 and 4 except that the semi-Diesel cycle of operation is employed, in which ignition is produced by bringing liquid fuel in contact with a highly compressed air charge. The combustion chambers 14, 23 and 32 are each provided with injection nozzles 42, 43 and 44, respectively.

In this arrangement, the cycle of operation is as follows: As the piston 11 moves outward on its intake stroke, an air charge is drawn into cylinder 10 above the piston, through inlet valve 15 in chamber 14 through port 17. When the piston 11 now moves inward on its compression stroke, the air charge previously drawn in cylinder 10 is compressed at high pressures into combustion chambers 14, 23 and 32. When said piston 11 has reached top dead center on its compression stroke, and is about to start its outward expansion stroke, liquid fuel is forced through injection nozzles 42, 43 and 44. Upon coming in contact with the highly compressed air charges in chambers 14, 23 and 32, said liquid fuel burns rapidly creating high pressures in the combustion chambers and in the cylinder effective in driving piston 11 outward on its expansion stroke. Scavenging of the cylinder 10, the combustion chambers 14 and 23 is accomplished by means of an exhaust valve 16 adjacent inlet valve 15 in combustion chamber 14. Scavenging of the combustion chamber 32 is accomplished by means of the exhaust valve 34 in said chamber 32, and which also aids in scavenging the cylinder 10 and combustion chamber 23.

Preferably, the injection nozzle 42 is brought into action first, then nozzle 44 and lastly injection nozzle 43. This not only tends to make ignition complete in all of the combustion chambers at approximately the same time, but also produces a range of high pressures over a greater portion of the piston travel on its working stroke, resulting in increased flexibility as well as increased efficiency of the engine.

Other firing orders of the combustion chambers may be employed, depending on the particular embodiment of the invention.

In conventional Diesel engines of the so-called solid injection type, an excess of air is present even under full load operation of the engine, when the maximum fuel charge is delivered. When the amount of injected fuel is reduced for light load operation, the above condition is even more pronounced, and results in poor flexibility and efficiency of this type of engine for light load operation and for idling. If, however, this type of engine is provided with a plurality of combustion chambers each having its own injection nozzle according to the invention, a better ratio of fuel to air charge is possible, thus increasing efficiency and flexibility of the engine. Furthermore, by injecting the fuel in the combustion chambers successively, the flexibility of the engine is increased still further. Also, injection of fuel in the various combustion chambers may be decreased successively or cut off altogether in one or more of the combustion chambers, and this contributes still further to the flexibility of the engine. It will be noted also that as the piston 10 approaches the end of its compression stroke, a high degree of turbulence of the compressed air charge is present in the combustion chambers 14, 23 and 32 due to the small clearance 22 between the piston head 28 and the cylinder head 18. This high degree of turbulence tends to produce better flame propagation, and is thus an additional factor contributing to increased efficiency of the engine.

While several illustrative embodiments are described herein in detail, it is not my intention to limit the scope of those particular embodiments, or otherwise than by the appended claims.

I claim:

1. An internal combustion engine comprising a cylinder and a cylinder head and a piston in the cylinder brought during the engine cycle into immediate proximity to the cylinder head with only a minimum necessary mechanical clearance therebetween, there being two combustion chambers for said engine, one being formed generally centrally of the cylinder between said piston and the cylinder head and the other being formed at one side of the cylinder between the cylinder and the cylinder head and ignition means in both of said chambers.

2. An internal combustion engine comprising a cylinder and a cylinder head and a piston in the cylinder brought during the engine cycle into immediate proximity to the cylinder head with only a minimum necessary mechanical clearance therebetween, there being two combustion chambers for said engine, one being formed generally centrally of the cylinder between said piston and the cylinder head and the other being formed at one side of the cylinder between the cylinder and the cylinder head, said other combustion chamber having arranged therein engine valve means and being substantially cut off by the piston at the top of the piston stroke and simultaneously operable ignition means in both of said chambers.

3. An internal combustion engine comprising a cylinder and a cylinder head and a piston in the cylinder brought during the engine cycle into immediate proximity to the cylinder head with only a minimum necessary mechanical clearance therebetween, there being two combustion chambers for said engine, one being formed generally centrally of the cylinder by registering generally semispherical pockets formed respectively in the top of said piston and in the lower face of the cylinder head and the other being formed at one side of the cylinder between the top of the cylinder and the bottom of the cylinder head and ignition means in both of said chambers.

4. An internal combustion engine comprising a cylinder and a cylinder head and a piston in the cylinder brought during the engine cycle into immediate proximity to the cylinder head with only a minimum necessary mechanical clearance therebetween, there being two combustion chambers for said engine, one being formed generally centrally of the cylinder between said piston and the cylinder head and the other being formed at one side of the cylinder between the cylinder and the cylinder head, said other combustion chamber having arranged therein engine valve means and communicating with the cylinder by an open port considerably greater in height than said clearance and which port is substantially closed by the piston at the top of the piston stroke.

5. An internal combustion engine comprising a cylinder and a cylinder head and a piston in the cylinder brought during the engine cycle into immediate proximity to the cylinder head with only a minimum necessary mechanical clearance therebetween, there being two combustion chambers for said engine, one being formed generally centrally of the cylinder between said piston and the cylinder head and the other being formed at one side of the cylinder between the cylinder and the cylinder head, said two combustion chambers having independent ignition means for firing the combustible mixture therein approximately at the top of the piston stroke.

6. An internal combustion engine comprising a cylinder and a cylinder head and a piston in the cylinder brought during the engine cycle into immediate proximity to the cylinder head with only a minimum necessary mechanical clearance therebetween, there being two combustion chambers for said engine, one being formed generally centrally of the cylinder between said piston and the cylinder head and the other being formed at one side of the cylinder between the cylinder and the cylinder head, said other combustion chamber having arranged therein engine valve means and communicating with the cylinder by an open port considerably greater in height than said clearance and which port is substantially closed by the piston at the top of the piston stroke, said two combustion chambers having independent ignition means for firing the combustible mixture therein approximately at the top of the piston stroke.

7. An internal combustion engine comprising a cylinder and a cylinder head and a piston in said cylinder brought during the operation of the engine into immediate proximity to the cylinder head with only a minimum mechanical necessary clearance therebetween, there being a plurality of combustion chambers for said engine substantially cut off from each other at the top of the piston stroke and one of which is formed by registering generally semispherical pockets formed respectively in the top of the piston and in the lower face of the cylinder head and ignition means in each of said chambers.

8. An internal combustion engine comprising a cylinder and a cylinder head and a piston in said cylinder brought during the engine cycle into immediate proximity to the cylinder head with only a minimum necessary mechanical clearance therebetween, and having three combustion chambers substantially cut off from each other at the top of the piston stroke, one of said chambers being formed between the top of the piston and the lower face of the cylinder head, and the other two being formed on opposite sides of the cylinder between the top of the cylinder wall and the lower face of the cylinder head.

9. An internal combustion engine comprising a cylinder and a cylinder head and a piston in said cylinder brought during the engine cycle into immediate proximity to the cylinder head with only a minimum necessary mechanical clearance therebetween, and having three combustion chambers substantially cut off from each other at the top of the piston stroke, one of said chambers being formed between the top of the piston and the lower face of the cylinder head, and the other two being formed on opposite sides of the cylinder between the top of the cylinder wall and the lower face of the cylinder head, and a separate ignition device in each of said combustion chambers.

10. An internal combustion engine comprising a cylinder and a cylinder head and a piston in said cylinder brought during the engine cycle into immediate proximity to the cylinder head with only a minimum necessary mechanical clearance therebetween, and having three combustion chambers substantially cut off from each other at the top of the piston stroke, one of said chambers being formed between the top of the piston and the lower face of the cylinder head, and the other two being formed on opposite sides of the cylinder between the top of the cylinder wall and the lower face of the cylinder head, said other combustion chambers communicating with the cylinder by ports of different heights and which (except for said clearance) are cut off by the piston at the top of the piston stroke.

11. An internal combustion engine comprising a cylinder and a cylinder head and a piston in said cylinder brought during the engine cycle into immediate proximity to the cylinder head with only a minimum necessary mechanical clearance therebetween, and having three combustion chambers substantially cut off from each other at the top of the piston stroke, one of said chambers being formed between the top of the piston and the lower face of the cylinder head, and the other two being formed on opposite sides of the cylinder between the top of the cylinder wall and the lower face of the cylinder head, said other combustion chambers communicating with the cylinder by ports of different heights and which (except for said clearance) are cut off by the piston at the top of the piston stroke, and an intake valve arranged in the chamber having the port of greater height and an exhaust valve in the chamber having the port of lessor height.

12. An internal combustion engine comprising a cylinder and a cylinder head and a piston in said cylinder brought during the operation of the engine into immediate proximity to the cylinder head with only a minimum mechanical necessary clearance therebetween, there being a plurality of combustion chambers for said engine substantially cut off from each other at the top of the piston stroke and one of which is formed by registering generally semispherical pockets formed respectively in the top of the piston and in the lower face of the cylinder head, and fuel-injecting means communicating with each of said combustion chambers.

13. An internal combustion engine comprising a cylinder and a cylinder head and a piston in said cylinder brought during the engine cycle into immediate proximity to the cylinder head with only a minimum necessary mechanical clearance therebetween, and having three combustion chambers substantially cut off from each other at the top of the piston stroke, one of said chambers being formed between the top of the piston and the lower face of the cylinder head, and the other two being formed on opposite sides of the cylinder between the top of the cylinder wall and the lower face of the cylinder head, and fuel-injecting means communicating with each of said combustion chambers.

LUDGER E. LA BRIE.